United States Patent [19]
Lüders et al.

[11] Patent Number: 5,437,801
[45] Date of Patent: Aug. 1, 1995

[54] AQUEOUS EMULSIONS CONTAINING FATTY ACID ESTERS OF N-METHYL-N,N,N-TRIHYDROXYETHYL AMMONIUM METHYL SULFATE

[75] Inventors: Harald Lüders, Darmstadt-Eberstadt; Kurt Kosswig, Marl; Hauke Steinhardt, Herne, all of Germany

[73] Assignee: Huels Aktiengesellschaft, Marl, Germany

[21] Appl. No.: 144,501

[22] Filed: Nov. 2, 1993

Related U.S. Application Data

[63] Continuation of Ser. No. 814,475, Dec. 30, 1991, abandoned.

[30] Foreign Application Priority Data

Jan. 17, 1991 [DE] Germany .................. 41 01 251.8

[51] Int. Cl.$^6$ .................. C11D 1/46; D06M 13/228
[52] U.S. Cl. .................. 252/8.8; 252/8.6; 252/8.9; 252/546; 252/547; 252/544
[58] Field of Search .................. 252/8.6, 8.8, 8.9, 544, 252/546, 547

[56] References Cited

U.S. PATENT DOCUMENTS

| | | | |
|---|---|---|---|
| 3,641,073 | 2/1972 | Buckley | 260/410.6 |
| 3,915,867 | 10/1975 | Kang et al. | |
| 4,399,049 | 8/1983 | Gray et al. | 252/8.9 |
| 4,429,859 | 2/1984 | Steiner et al. | 252/8.6 |
| 4,830,771 | 5/1989 | Ruback et al. | 252/8.6 |
| 4,963,274 | 10/1990 | Ruback et al. | 252/8.6 |
| 5,023,003 | 6/1991 | Yamamura et al. | 252/8.8 |
| 5,066,414 | 11/1991 | Chang | 252/8.8 |
| 5,133,885 | 7/1992 | Contor et al. | 252/8.6 |
| 5,180,508 | 1/1993 | Birkhan et al. | 252/8.8 |
| 5,288,417 | 2/1994 | Bauer et al. | 252/8.8 |
| 5,288,847 | 2/1994 | Harmalker et al. | 252/8.8 |

FOREIGN PATENT DOCUMENTS

| | | |
|---|---|---|
| 0040562 | 11/1981 | European Pat. Off. |
| 0165138 | 12/1985 | European Pat. Off. |
| 0284036 | 9/1988 | European Pat. Off. |
| 0295385 | 12/1988 | European Pat. Off. |
| 0295386 | 12/1988 | European Pat. Off. |
| 0330261 | 8/1989 | European Pat. Off. |
| 230711 | 12/1985 | German Dem. Rep. |
| WO9101295 | 2/1991 | WIPO |

OTHER PUBLICATIONS

Seifen-Ole-Fette-Wachse, vol. 115, No. 1, pp. 3–8, Jan. 19, 1989, L. Godefroy, et al., "Neue Kationische Tenside Fur Konzentrierte Textilweichmacher".

Primary Examiner—Paul Lieberman
Assistant Examiner—Michael P. Tierney
Attorney, Agent, or Firm—Oblon, Spivak, McClelland, Maier & Neustadt

[57] ABSTRACT

Aqueous emulsions which contain the fatty acid esters of N-methyl-N,N,N-trihydroxyethyl ammonium methyl sulfate as cationic tensides are suitable as fabric softeners. These fabric softener emulsions have the disadvantage, however, that emulsions with high concentrations can be handled only by means of dispersion agents. Therefore, an aqueous emulsion of fatty acid ester of N-methyl-N,N,N-trihydroxyethyl ammonium methyl sulfate is proposed which is stable in storage, and demonstrates an active substance content of more than 15% at a viscosity below 100 mPa.s at 25° C. This emulsion can be used without any additional emulsifier. The emulsion according to the invention has quaternary ammonium compounds with 1.1 to 1.7 fatty acid groups, as a mean value.

6 Claims, No Drawings

5,437,801

AQUEOUS EMULSIONS CONTAINING FATTY ACID ESTERS OF N-METHYL-N,N,N-TRIHYDROXYETHYL AMMONIUM METHYL SULFATE

This application is a Continuation of Ser. No. 07/814,475 filed on Dec. 30, 1991 which is now abandoned.

FIELD OF THE INVENTION

The invention relates to aqueous emulsions containing fatty acid esters of N-methyl-N,N,N-trihydroxyethyl ammonium methyl sulfate.

DISCUSSION OF THE BACKGROUND

Fatty acid esters of N-methyl-N,N,N-trihydroxyethyl ammonium methyl sulfate are cationic tensides. The production of these esters can take place according to various methods known from the literature.

U.S. Pat. No. 3,915,876 describes a synthesis method for N-methyl-N,N-di-($\beta$-$C_{14}$-$C_{18}$-acyloxyethyl)-N-$\beta$-hydroxyethyl ammonium methyl sulfate starting with triethanolamine and fatty acid methyl esters in a molar ratio of 1:2, by transesterification in the presence of sodium methylate as a catalyst, under mild conditions, and subsequent quaternization with dimethyl sulfate. Particularly light-colored products are obtained.

DE 37 10 064 contains the conversion of glycerin tristearate with triethanolamine. In this transesterification, a product mixture of about 50% triethanolamine stearates and 50% glycerin stearates, as well as free glycerin, is obtained. After its quaternization with methyl chloride, a mixture of cationic tenside and the by-products mentioned, which are not separated off, is obtained.

DE 37 20 332 claims a method for the production of fatty acid esters of N-methyl-N,N,N-trihydroxyethyl ammonium methyl sulfate by direct esterification of triethanolamine with fatty acid in the presence of catalytic amounts of fatty acid methyl esters and subsequent quaternization with dimethyl sulfate.

The cationic tensides are generally diluted with up to 25% isopropanol or other alcohols or diols of low molecular weight in order to make them easier to handle.

The products which can be produced according to the prior methods discussed above are particularly useful as fabric softeners with good ecotoxicological properties. In this area of technology it is common for emulsions consisting of cationic tensides, dispersion agents, perfume and pigments as well as other components, to get into water.

The cationic tenside is generally present in the form of micro-dispersed droplets, which are not allowed to coalesce, since this would result in separation of the product into several phases. In the formulation of a fabric softener, it is therefore of great importance that the emulsion be stabilized. The current trend towards so-called "fabric softener concentrates" with an active substance content of 15-25% presents the formulator with significant viscosity problems.

In spite of the high content of cationic tensides, the emulsion must be made as non-viscous as possible, because this achieves not only better pourability, but also a more uniform distribution of the active substance in the rinse, combined with an increased softening effect. To reduce viscosity, various dispersion agents are added.

U.S. Pat. No. 3,915,867 describes that N-methyl-N,N-di-($\beta$-$C_{14}$-$C_{18}$-acyloxyethyl)-N-$\beta$-hydroxyethyl ammonium methyl sulfate forms self-emulsifying fabric softeners and that no emulsifiers, such as non-ionic tensides, for example, are required. The softening properties of an 8%, i.e. dilute, emulsion are described, without viscosity information. The active substance was produced on the basis of fatty acid methyl esters.

EP 0 040 562 discloses 20% fabric softener concentrates with N-methyl-N,N-di-($\beta$-$C_{14}$-$C_{18}$-acyloxyethyl)-N-$\beta$-hydroxyethyl ammonium methyl sulfate as the cationic active substance. As dispersion agents, 10 to 67% non-ionic tensides, with reference to the cationic tenside, e.g. fatty alcohol oxyethylates, are used. The products have viscosities from 100–900 mPa.s and must be adjusted to viscosities of 40–80 mPa.s before use, by being diluted with water.

L. Godefroy and H. Hein, Seifen-Öle-Fette-Wachse [Soaps-Oils-Fats-Waxes] 115, 3 (1989) use dialkyl ammonium esters on the basis of partially hydrogenated tallow as a fabric softener component and achieve emulsions at 30–60 mPa.s by adding 2.8 to 3.6% N-methyl-N,N,N-trihydroxyethyl ammonium methyl sulfate, with reference to the cationic tenside, as the "fluidizing agent" to liquefy concentrated (16.7–27.8%) emulsions. Without this liquefier, a 5.56% emulsion already has a viscosity of 60–80 mPa.s at 20° C.

DE 37 20 331 eliminates the disadvantage of high viscosities with a combination of the di-fatty acid ester of N-methyl-N,N,N-trihydroxyethyl ammonium methyl sulfate with 10 to 90% of a second cationic component, e.g. di-tallow fatty acid alkylimidazolinium methyl sulfate, di-stearyl dimethyl ammonium chloride, N-methyl-N-triethoxy-N,N-bis-[2-(tallow fatty amido)-ethyl]ammonium methyl sulfate, and optimally with a dispersion agent, e.g. a mixture of oleylaminoxethylates and oleic acid. The preparation of such formulations requires additional effort for storage and mixing.

These dispersion agents necessary for fabric softeners represent a significant disadvantage in terms of application technology.

It was therefore the task of the present invention to produce aqueous emulsions that have a low viscosity, are self-emulsifying, stable, concentrated and contain fatty acid esters on a nitrogen basis.

SUMMARY OF THE INVENTION

An object of the invention is to provide a concentrated aqueous emulsion which is stable in storage, with active substance contents above 15% comprising: a fatty acid ester of N-methyl-N,N,N-trihydroxyethyl ammonium methyl sulfate wherein the quaternary ammonium compound has 1.1 to 1.7 fatty acid groups, as a mean value, and the emulsion does not contain any additional emulsifier and has a viscosity below 100 mPa.s at 25° C.

DETAILED DESCRIPTION OF THE PREFERRED EMBODIMENTS

Products used as cationic active substances are those produced by ester synthesis from triethanolamine and $C_{14}$-$C_{18}$ fatty acids in a molar ratio of 1:1.1 to 1:1.7 and subsequent quaternization. In Example 1, the synthesis of a tallow fatty acid ester of N-methyl-N,N,N-trihydroxyethyl ammonium methyl sulfate with an average of 1.4 ester groups per molecule is described, which also has validity for the production of the other esters mentioned, after modification of the substance amounts. It is practical if the active substance is diluted with up to 30% isopropanol, to produce a commercial form that can be handled more easily.

Low viscosity, in this connection, means a viscosity below 100 mPa.s at 25° C., measured with a Brookfield viscosimeter with spindle No. 2 at 30 rpm. Stable, in this connection, means that an emulsion containing at least 15% of the active substance mentioned in the title remains in suspension for about 21 days at 20° C.

The task was accomplished by the fact that fatty acid esters of N-methyl-N,N,N-trihydroxyethyl ammonium methyl sulfate which have 1.1 to 1.7 long-chain $C_{14}$-$C_{18}$ groups, as a mean value, per nitrogen atom, are used as the cationic active substance.

The object of the invention is therefore an aqueous emulsion of fatty acid ester of N-methyl-N,N,N-trihydroxyethyl ammonium methyl sulfate which is stable in storage, with active substance contents above 15%, which is characterized by the fact that the quaternary ammonium compound has 1.1 to 1.7 fatty acid groups, as a mean value, and that the emulsion does not contain any additional emulsifier and has a viscosity below 100 mPa.s at 25° C. It was surprisingly found that emulsions of these active substances have low viscosity and are stable without the use of any emulsifier, even if the aqueous emulsion is modified by the addition of perfume, synthetic and natural dyes and pigments.

Cationic active substances with $C_{16}$-$C_{18}$ fatty acid groups are preferred, especially those that are produced on the basis of stearic acid, tallow fatty acid or partially hydrogenated tallow fatty acids.

Also preferred are cationic active substances with 1.4 to 1.6 fatty acid groups per nitrogen atom.

The active substance can be worked into water hardened with calcium chloride using normal mechanical processing methods. An effective stirrer, e.g. Ultra-Turrax stirrer, is preferably used for the production of the emulsion.

Emulsions with an active substance concentration of at least 15% are preferred, and active substance concentrations of 15-25% are especially preferred. In the water, a calcium chloride concentration of 0.1 to 2%, preferably 0.3 to 1%, is adjusted. The emulsion can be modified by adding conventional perfumes, synthetic and natural dyes and pigments.

The production process is described in Examples 2ff. It can be modified for similar preparations. Comparison examples 5 and 6 show that cationic active substances of the alkyl ammonium ester type with more than 1.7 ester groups per nitrogen atom coalesce after a storage period of only 1 day as a 20% emulsion, while those with 1.1 to 1.7 ester groups per nitrogen atom are still stable after 21 days of storage, at both 20° C. and 40° C., and have low viscosities. The products stored at 20° C. demonstrate viscosities of 15 to 35 mPa.s at a measurement temperature of 25° C. Even at a storage temperature of 40° C., the viscosities, in a range between 25 and 75 mPa.s, remain very low.

Emulsions on the basis of fatty acid esters of N-methyl-N,N,N-trihydroxyethyl ammonium methyl sulfate with 1.4 to 1.6 tallow fatty acid groups are especially suited as fabric softeners.

Advantages of the emulsions according to the invention are:

Emulsions of the title compound can be produced without adding emulsifier.

The emulsions demonstrate very low viscosity and very good stability.

It is not necessary to add other cationic tensides.

The emulsions can be used as fabric softeners (Example 7).

Having generally described this invention, a further understanding can be obtained by reference to certain specific examples which are provided herein for purposes of illustration only and are not intended to be limiting unless otherwise specified.

EXAMPLE 1

Production of fatty acid esters of N-methyl-N,N,N-trihydroxyethyl ammonium methyl sulfate with 1.4 tallow fatty acid groups per molecule, as a mean value.

756 g tallow fatty acid and 6.3 g tallow fatty acid methyl ester are placed in a 2 liter stirring apparatus with a drip funnel, distillation cover and application of nitrogen gas, and stirred for 15 min. Then 298 g triethanolamine are added and the reaction mixture is heated to 195° C., while nitrogen is bubbled through, until the acid value has dropped below 5 mg KOH/g (approximately 3 hours). During the reaction, the reaction water is distilled off. The mixture is cooled to 90° C., during stirring 247 g dimethylsulfate are added, through which the temperature increases to 120° C.

After stirring for another 30 minutes, the mixture is cooled to 90° C., diluted to 85% with isopropanol, and, if necessary, bleached with 2.5% of 30% hydrogen peroxide. Before the mixture is filled into containers, Drager tubes are used to test for dimethyl sulfate in the gas phase. The value should be below 0.005 ppm.

EXAMPLE 2

Production of an emulsion containing a fatty acid ester of N-methyl-N,N,N-trihydroxyethyl ammonium methyl sulfate with 1.1 tallow fatty acid groups.

In a product presentation system with product circulation, which leads through a homogenization chamber with an Ultra-Turrax homogenizer, 250 g drinking water (12 °dH), 2.5 g 25% calcium chloride solution and 5 g perfume are presented and emulsified at room temperature. With the homogenizer continuing to run, a melt of 132.1 g cationic tenside 85% in isopropanol (112.3 g active substance), heated to 50° C., is added within approximately 1 min. At the same time, dilution with a mixture of 98 g water and 7.5 g 25% calcium chloride solution takes place.

Finally, 5 g pigment (Luconyl blue) is mixed in. This yields 500 g emulsion with 20% cationic active substance with a viscosity of 30 mPa.s (25° C.). After 21 days of storage at 20° C., the viscosity is 35 mPa.s, and at 40° C., it is 75 mPa.s.

EXAMPLE 3

An emulsion is produced analogous to Example 2, with the difference that a cationic active substance with 1.4 tallow fatty acid groups per molecule, as a mean value, is used. This results in an emulsion with a viscosity of 15 mPa.s (25° C.). After 21 days of storage at 20° C., the viscosity is 15 mPa.s, and at 40° C., it is 25 mPa.s.

EXAMPLE 4

An emulsion is produced analogous to Example 2, with the difference that a cationic active substance with 1.6 tallow fatty acid groups per molecule, as a mean value, is used. This results in an emulsion with a viscosity of 30 mPa.s (25° C.). After 21 days of storage at 20° C., the viscosity is 35 mPa.s, and at 40° C., it is 35 mPa.s.

EXAMPLE 5

An emulsion is produced analogous to Example 2, with the difference that a cationic active substance with 1.8 tallow fatty acid groups per molecule, as a mean value, is used. This results in an emulsion which coalesces after only one day.

EXAMPLE 6

An emulsion is produced analogous to Example 2, with the difference that a cationic active substance with 2.0 tallow fatty acid groups per molecule, as a mean value, is used. This results in an emulsion which coalesces after only one day.

EXAMPLE 7

Two white cotton terry cloth towels were washed separately with 4 kg cotton ballast cloth at 95° C. in a household washing machine, with a phosphate-free all-temperature detergent, and subsequently 27 g of an emulsion according to Example 3 was added to the rinse as a fabric softener. After drying, the softness of the towels, in comparison with non-softened towels and towels softened with a brand name product, was evaluated as good.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. In a concentrated aqueous emulsion which has a viscosity ranging from 100 to 15 mpa.s at 25° C. and which is stable in storage, consisting of:
    (1) water,
    (2) from 0.1 to 2% calcium chloride, relative to the water content of the emulsion,
    (3) from 15% by weight up to 25% by weight of a fatty acid ester of N-methyl-N,N,N-trihydroxyethyl ammonium methyl sulfate, wherein the esterifying fatty acid component of the fatty acid ester of N-methyl-N,N,N-trihydroxyethyl ammonium methyl sulfate is selected from the group consisting of hydrogenated tallow fatty acid, partially hydrogenated tallow fatty acid, stearic acid and mixtures thereof, wherein said fatty acid ester of N-methyl-N,N,N-trihydroxyethyl ammonium methyl sulfate is esterified to an extent ranging from 1.1 to 1.7 fatty acid groups per molecule of said N-methyl-N,N,N-trihydroxyethyl ammonium methyl sulfate and wherein the fatty acid ester is prepared by reacting fatty acid, optionally with fatty acid alkyl ester, and triethanolamine, and then reacting the product obtained with dimethylsulfate, and
    (4) at least one member selected from the group consisting of perfumes, synthetic and natural dyes and pigments wherein the composition does not coalesce.

2. A concentrated aqueous emulsion having a viscosity ranging from less than 100 to 15 mpa.s at 25° C. which is stable in storage, consisting of:
    (1) water,
    (2) from 15% by weight to 25% by weight of a fatty acid ester of N-methyl-N,N,N-trihydroxyethyl ammonium methyl sulfate, wherein the esterifying fatty acid component of the fatty acid ester of N-methyl-N,N,N-trihydroxyethyl ammonium methyl sulfate is selected from the group consisting of hydrogenated tallow fatty acid, partially hydrogenated tallow fatty acid, stearic acid and mixtures thereof, wherein said fatty acid ester of N-methyl-N,N,N-trihydroxyethyl ammonium methyl sulfate is esterified to an extent ranging from 1.1 to 1.7 fatty acid groups per molecule of said N-methyl-N,N,N-trihydroxyethyl ammonium methyl sulfate and wherein the fatty acid ester is prepared by reacting fatty acid, optionally with fatty acid alkyl ester, and triethanolamine, and then reacting the product obtained with dimethylsulfate, and
    (3) at least one member selected from the group consisting of perfumes, synthetic and natural dyes and pigments wherein the composition does not coalesce.

3. A concentrated aqueous emulsion which is stable in storage, consisting of:
    water and from 15% by weight up to 25% by weight of a fatty acid ester of N-methyl-N,N,N-trihydroxyethyl ammonium methyl sulfate, wherein the esterifying fatty acid component of the fatty acid ester of N-methyl-N,N,N-trihydroxyethyl ammonium methyl sulfate is selected from the group consisting of hydrogenated tallow fatty acid, partially hydrogenated tallow fatty acid, stearic acid and mixtures thereof, wherein said fatty acid ester of N-methyl-N,N,N-trihydroxyethyl ammonium methyl sulfate is esterified to an extent ranging from 1.1 to 1.7 fatty acid groups per molecule of said N-methyl-N,N,N-trihydroxyethyl ammonium methyl sulfate and wherein the fatty acid ester is prepared by reacting fatty acid, optionally with fatty acid alkyl ester, and triethanolamine, and then reacting the product obtained with dimethyl sulfate, the emulsion having a viscosity ranging from less than 100 to 15 mpa.s at 25° C. wherein the composition does not coalesce.

4. The emulsion of claim 3, wherein the viscosity of the emulsion is less than 50 mPa.s.

5. A concentrated aqueous emulsion which is stable in storage, consisting of:
    water, from 0.1 to 2% calcium chloride, relative to the water content of the emulsion, and from 15% by weight up to 25% by weight of a fatty acid ester of N-methyl-N,N,N-trihydroxyethyl ammonium methyl sulfate, wherein the esterifying fatty acid component of the fatty acid ester of N-methyl-N,N,N-trihydroxyethyl ammonium methyl sulfate is selected from the group consisting of hydrogenated tallow fatty acid, partially hydrogenated tallow fatty acid, stearic acid and mixtures thereof, wherein said fatty acid ester of N-methyl-N,N,N-trihydroxyethyl ammonium methyl sulfate is esterified to an extent ranging from 1.1 to 1.7 fatty acid groups per molecule of said N-methyl-N,N,N-trihydroxyethyl ammonium methyl sulfate and wherein the fatty acid ester is prepared by reacting fatty acid, optionally with fatty acid alkyl ester, and triethanolamine, and then reacting the product obtained with less than 100 to 15 mpa.s at 25° C. wherein the composition does not coalesce.

6. The emulsion of claim 5, wherein the calcium chloride content ranges from 0.3-1%.

* * * * *